US011386728B2

(12) United States Patent
Otican et al.

(10) Patent No.: US 11,386,728 B2
(45) Date of Patent: Jul. 12, 2022

(54) SYSTEM AND METHOD FOR GRANTING ACCESS TO OR FOR STARTING AN OBJECT

(71) Applicant: Continental Automotive GmbH, Hannover (DE)

(72) Inventors: Daniel Otican, Timisoara (RO); Ali Haider Syed, Regensburg (DE)

(73) Assignee: Continental Automotive GmbH

( * ) Notice: Subject to any disclaimer, the term of this patent is extended or adjusted under 35 U.S.C. 154(b) by 0 days.

(21) Appl. No.: 17/282,970

(22) PCT Filed: Sep. 13, 2019

(86) PCT No.: PCT/EP2019/074523
§ 371 (c)(1),
(2) Date: Apr. 5, 2021

(87) PCT Pub. No.: WO2020/069839
PCT Pub. Date: Apr. 9, 2020

(65) Prior Publication Data
US 2021/0350641 A1    Nov. 11, 2021

(30) Foreign Application Priority Data
Oct. 5, 2018 (EP) ..................................... 18465591

(51) Int. Cl.
*G06Q 30/02* (2012.01)
*G06F 16/951* (2019.01)
(Continued)

(52) U.S. Cl.
CPC ..... *G07C 9/00309* (2013.01); *G07C 9/00817* (2013.01); *G07C 9/20* (2020.01); *G07C 2009/00825* (2013.01)

(58) Field of Classification Search
CPC .. G07C 9/00309; G07C 9/20; G07C 9/00817; G07C 2009/00825
See application file for complete search history.

(56) References Cited

U.S. PATENT DOCUMENTS 8,009,519 B2 *   8/2011   Jazra ...................... G04R 20/14
                                                              368/46
10,529,162 B2 *  1/2020   Fujiwara ............. H04W 12/062
(Continued)

FOREIGN PATENT DOCUMENTS

JP       2016012369 A      1/2016

OTHER PUBLICATIONS

Search Report dated Apr. 8, 2019 from corresponding European Patent Application No. EP 18466591.8.
(Continued)

*Primary Examiner* — Sisay Yacob

(57) ABSTRACT

Disclosed is a system comprising a portable electronic device, and a backend device, wherein the portable electronic device is configured to, upon occurrence of a triggering event, send a first request message to the backend device, the backend device, upon receipt of the first request message, is configured to read an internal device clock and send a first response message to the portable electronic device, wherein the first response message comprises information about the present internal device time. The portable electronic device, upon receipt of the first response message, is further configured to at least one of update an internal clock of the portable electronic device with the present internal device time, and send a second response message to an object, wherein the second response message comprises an information about the present internal device time.

7 Claims, 4 Drawing Sheets

(51) Int. Cl.
*G06F 9/54* (2006.01)
*G06N 20/00* (2019.01)
*G06F 40/20* (2020.01)
*G07C 9/00* (2020.01)
*G07C 9/20* (2020.01)

(56) References Cited

U.S. PATENT DOCUMENTS

2001/0046872 A1 11/2001 Masuda
2009/0219205 A1 9/2009 Jazra et al.
2018/0261028 A1 9/2018 Fujiwara et al.

OTHER PUBLICATIONS

International Search Report and Written Opinion dated Dec. 4, 2019 from corresponding International Patent Application No. PCT/EP2019/074523.

* cited by examiner

SYSTEM AND METHOD FOR GRANTING ACCESS TO OR FOR STARTING AN OBJECT

The current invention relates a system and method for granting access to or for starting an object, in particular a vehicle.

Most vehicles today may be unlocked and started using an electronic key. Some start and entry systems are known in which the user needs to press an unlocking button on the key to unlock the vehicle. In order to start the vehicle, the key usually has to be inserted into an arrangement which replaces the ignition switch, as is known from older vehicles. Other start and entry systems are known in which the vehicle may be unlocked and started without the user having to press a button or having to insert the key into any arrangement. Such start and entry systems are often called keyless start and entry systems. With keyless start and entry systems, the vehicle may be unlocked automatically when the key is detected within a certain distance from the vehicle. In order to start the vehicle, a start button within the vehicle usually has to be pressed while the key is detected as being located near or within the vehicle.

Many other start and entry systems are known. Today, smartphones or other electronic devices may function as the vehicle key. That means that when the user's smartphone is detected within a certain distance from the vehicle, the vehicle may be unlocked and subsequently started when, in addition, a start button within the vehicle is pressed. This reduces the number of devices a user has to carry with him. Most people today own a smartphone which they carry with them anyway. Therefore, carrying an additional car key becomes superfluous if the smartphone itself functions as the vehicle key. For the smartphone to be able to take over the function of a vehicle key, usually a virtual key is stored in the smartphone. Such virtual keys may be valid permanently or only for a certain time period. For example, a user can grant access to the vehicle to family members or friends by sending them a virtual key that is valid for a defined time period only. Further, car sharing is becoming more and more popular. A rental car company may provide virtual keys to its customers which are valid for the term of lease.

However, security plays a very important role in such systems as unauthorized people need to be prevented from using the vehicle.

The problem to be solved by the current invention is to provide a system and method for granting access to or for starting an object, e.g., a vehicle, which provide a heightened level of security.

A system includes a portable electronic device and a backend device, wherein the portable electronic device is configured to, upon occurrence of a triggering event, send a first request message to the backend device, the backend device, upon receipt of the first request message, is configured to read an internal device clock and send a first response message to the portable electronic device, wherein the first response message comprises information about the present internal device time. The portable electronic device, upon receipt of the first response message, is further configured to at least one of update an internal clock of the portable electronic device with the present internal device time, and send a second response message to an object, wherein the second response message comprises information about the present internal device time.

The system may further comprise an object, and the portable electronic device may be configured to send a virtual key to the object.

The portable electronic device may take over the function of a key to the object. Using virtual keys is an easy and fast way to grant access to objects to different users at any time.

The virtual key may be valid for a predefined period of time and may include information about the predefined period of time.

In this way, users may only be allowed to access the object at defined times. Access to the object may be managed very effectively. The security of the system may be increased.

The object may be configured to receive the virtual key from the portable electronic device, and compare the information about the predefined period of time with an internal clock. The object may be opened or started when the virtual key is determined to be valid at the time of receipt of the virtual key.

The object may be configured to send a second request message to the portable electronic device before comparing the information about the predefined period of time with an internal clock, the triggering event in this case comprising the receipt of the second request message from the object.

The object, therefore, requests a time update before checking the validity of the virtual key. In this way, the security of the system may be increased, as a possible malfunctioning or a fraudulent attempt to access the object may be prevented.

The triggering event may further comprise a user input received via a user interface of the portable electronic device.

The user may request an update of the portable device's clock on his own regard.

The backend device may be further configured to, upon receipt of the first request message, perform an update of its internal device clock.

In this way, it may also be ensured that the clock of the backend device is always updated when sending out response messages to the portable electronic device.

Updating the internal device clock of the backend device may comprise sending a third request message to a network time protocol server and receiving a second response message from the network time protocol server, the second response message comprising information about the present time.

A network protocol server always provides the correct time at the present location of a device.

The first response message may comprise information about a time zone, the portable electronic device may be configured to compare the time zone information of the first response message with a time zone setting of the portable electronic device and automatically update or require a user to manually update the time zone settings of the portable electronic device if a difference between the time zone information of the first response message and the time zone settings of the portable electronic device is greater than a predefined threshold value.

In this way, any deviations may be prevented that may occur when the user changes the time zone.

The object may be a vehicle.

A method includes, upon occurrence of a triggering event, sending a first request message from a portable electronic device to a backend device, upon receipt of the first request message, reading an internal device clock and sending a first response message from the backend device to the portable electronic device, wherein the first response message comprises information about the present internal device time. The method further includes at least one of updating an internal clock of the portable electronic device with the present internal device time, and sending a second response message to an object upon receipt of the first response message, wherein the second response message comprises information about the present internal device time.

Examples are now explained with reference to the drawings. In the drawings the same reference characters denote like features.

Figure 1:
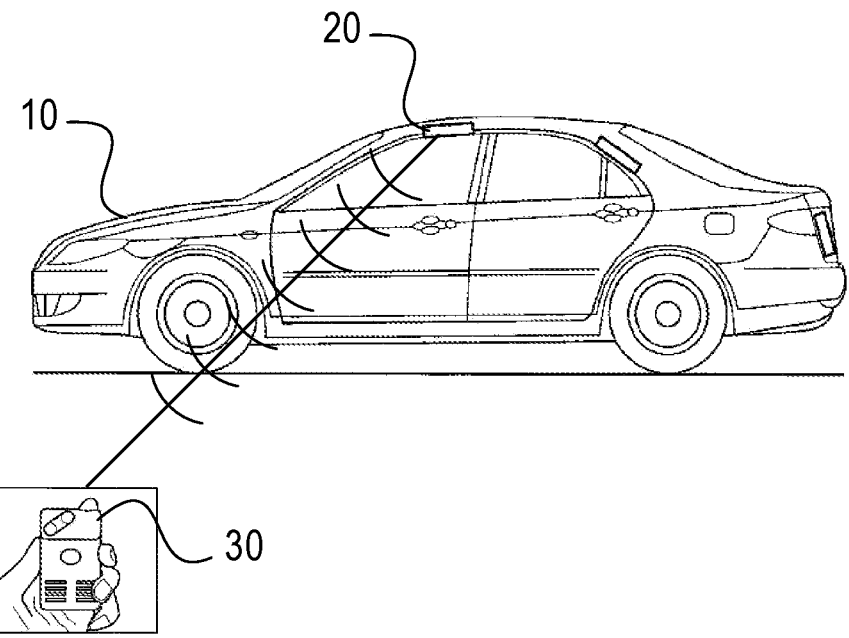
FIG. 1 illustrates the general principle of a keyless start and entry system.

FIG. 1 illustrates a vehicle 10 with a conventional keyless start and entry system. The start and entry system comprises a control unit 20. The control unit 20 may be arranged anywhere within or on the vehicle 10. The control unit 20 is configured to trigger an unlocking or engine start process if an electronic key belonging to the vehicle 10 is detected near or inside the vehicle 10. The control unit 20 sends out inquiry signals. Such inquiry signals are usually low frequency signals (about 20 kHz to 200 kHz). The inquiry signals are coded with a first coding chart. The inquiry signals may be received by a transponder unit 30 (vehicle key) if the transponder unit 30 is within the range of the signals. The transponder unit 30 decodes, analyses and/or further processes the inquiry signals. After further processing the inquiry signals, the transponder unit 30 sends response signals back to the control unit 20. The response signals are coded with a second coding chart. The response signals may be generated by means of load modulation, for example, and may be decoded in the vehicle 10.

The vehicle 10 knows both coding charts and may compare the original inquiry signals with the received response signals. If the response signals are identified as being correct, the vehicle 10 may be unlocked. If a start button is pressed and the response signals are identified as being correct, the vehicle 10 may be started. If, after sending the inquiry signals, no response signals or incorrect response signals are received within a certain time, nothing happens and the vehicle 10 remains locked and/or turned off.

The transponder unit 30 may be arranged within a vehicle key or a portable electronic device such as a mobile phone, for example, which the user of the vehicle 10 carries with him.

The control unit 20 may send out inquiry signals in regular intervals or in response to a certain trigger event. Such a trigger event may be the user touching the door handle or pressing a start button, for example.

The vehicle 10 may be any kind of vehicle, for example a passenger car, a truck, a bus, a train, a tractor, a motorcycle, a boat, or an aircraft.

In many start and entry systems today, a portable electronic device such as a smart phone, a laptop, a tablet device, or a portable multimedia device, for example, may act as the vehicle key (transponder unit 30). In such cases, it is no longer necessary for the user to carry a separate vehicle key. Most people today possess smart phones which they carry with them most of the time. By having the smart phone function as a vehicle key, for example, it becomes no longer necessary to carry a dedicated vehicle key in addition to the smart phone. In known systems, a portable electronic device is programmed once and may then subsequently function as a vehicle key. Any electronic vehicle keys can be stored in the portable electronic device and may subsequently be used by the portable electronic device.

However, such systems have several disadvantages. For example, many portable electronic devices do not fulfill security requirements. Because of this, such systems may be easily hacked (e.g., relay attack). Further, many users today replace their smartphones or other electronic devices much more often than their vehicles. A portable electronic device, therefore, very often is not assigned to a specific vehicle for the entire lifetime of the vehicle. Even further, car sharing is becoming more and more popular. Therefore, many users need to be able to unlock and start a particular vehicle and, possibly, enable further functions of the vehicle. On the other hand, there is the possibility that an internal clock of the vehicle may malfunction or be deliberately manipulated. In this way, unauthorized persons could gain unauthorized access to the vehicle. This will be described in greater detail below with respect to FIG. 2.

Figure 2:
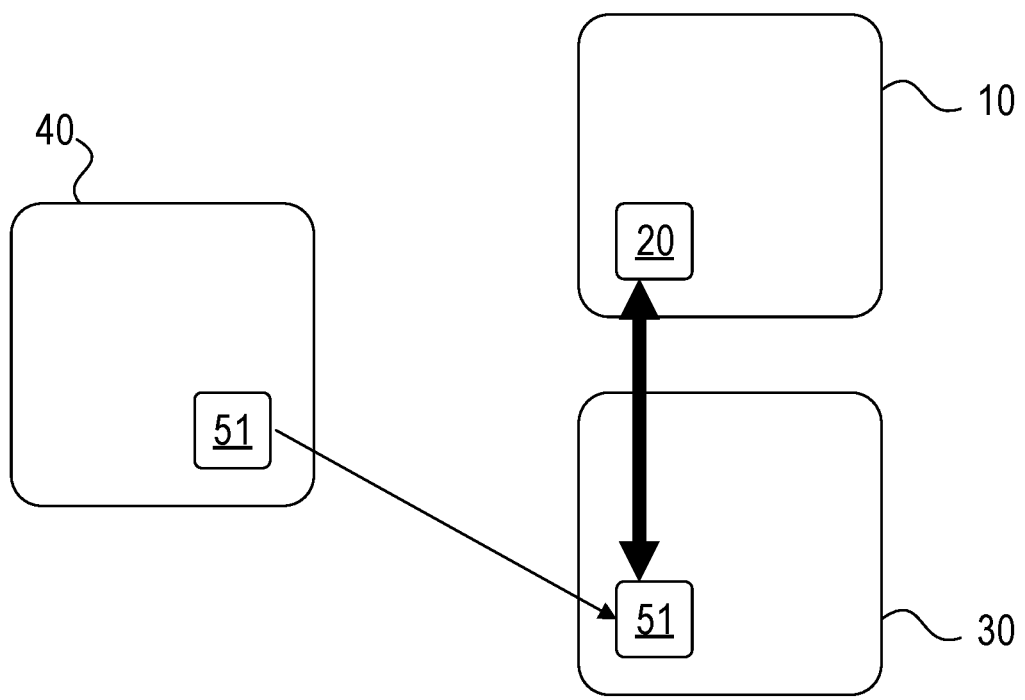
FIG. 2 illustrates an exemplary system for granting access to or starting an object using a virtual key.

FIG. 2 illustrates a system for granting access to or for starting an object 10 using a virtual vehicle key 51. In the example of FIG. 2, the object 10 is a vehicle.

The system comprises a portable electronic device 30 (transponder unit). The system further comprises a backend device 40. The backend device 40 is configured to generate, upon request or upon occurrence of a triggering event, a virtual key 51 and to transmit the virtual key 51 to the portable electronic device 30.

According to one example, the backend device 40 transmits the virtual key 51 via a wireless connection, such as a WiFi connection, or via a cloud, for example. That is, a portable electronic device 30 and a vehicle 10 may only receive a virtual key 51 while they are connected to the backend device 40. After receiving the virtual key 51 from the backend device 40, the portable electronic device 30 may store the virtual key 51. Communication channels between the portable electronic device 30 and the backend device 40, and between the vehicle 10 and the backend device 40 may be secure communication channels. For example, any data that is sent via the communication channels may be encrypted.

After receiving the virtual key 51, the vehicle 10 and the portable electronic device 30 may start communicating with each other. For example, the portable electronic device 30 and the vehicle 10 may establish a Bluetooth connection, Bluetooth Low Energy (BLE) connection, ultra-wideband (UWB) connection, near field communication (NFC) connection, WiFi connection, or any other suitable connection. While communicating, it may be determined whether the virtual key 51 is a valid key. If the virtual key 51 is not valid, nothing happens and the vehicle 10 will remain locked and cannot be started. If the virtual key 51 is determined to be valid and the portable electronic device 30 is further detected within a predefined distance from the vehicle 10, the vehicle 10 may be unlocked and/or started. Alternatively, or additionally, one or more other functions of the vehicle 10 may be enabled, e.g., the use of a sound system, the use of a navigation system, or any other comfort or safety systems.

For example, the vehicle 10 may only be unlocked if the portable electronic device 30 is detected within a distance of maximally 10 meters, maximally 5 meters or maximally 2 meters from the vehicle 10. In order to be able to start the vehicle 10, it might be required that the portable electronic device 30 be detected within the vehicle 10. Other requirements concerning the maximum distance are also possible.

If the portable electronic device 30 is not detected within the predefined distance, the vehicle 10 may remain locked and cannot be started.

A triggering event which initiates the generation of a virtual key 51 may comprise at least one of the following events: a request supplied by a user via the portable electronic device 30, the detection of the portable electronic device 30 within a predefined distance from the vehicle 10, and a request from an authorized authority. An authorized authorizy may be a fleet management, a company or individual which owns the vehicle, or an OEM (Original Equipment Manufacturer), for example.

For example, an application (app) may be installed on the portable electronic device 30. If a user wishes to use the vehicle 10, he may start the application and express his intention of using the vehicle 10. The portable electronic device 30 may establish a connection with the backend device 40 which subsequently generates and transmits the virtual key 51 to the portable electronic device 30. According to another example, the portable electronic device 30 detects that it has entered a predefined range surrounding the vehicle 10 and sends a request to the backend device 40 autonomously. That is, the user does not necessarily have to take any action himself. According to an even further example, the vehicle 10 may be a rental car. The user may contact the rental car company and rent the vehicle 10 for a certain amount of time (e.g., for one day). The rental car company may trigger the generation of the virtual key 51 which is subsequently transmitted to the portable electronic device 30 of the user. Any other suitable triggering events are also possible.

According to one example, the virtual key 51 may only be valid for a predefined amount of time. For example, the virtual key 51 may only be valid for one hour, one day or one week. The predefined period of time may be specified by an owner of the vehicle 10, for example. For example, the owner of a vehicle lends the vehicle 10 to a friend for one day. He may trigger the generation of a virtual key 51 which is sent to the portable electronic device 30 of the friend. In order to prevent the friend from using the car longer than intended, the virtual key 51 may only be valid as long as the owner intents to let him use the vehicle 10. According to another example, the predefined time may be set by a rental car company. For example, if a user rents the vehicle 10 for a week, the virtual key 51 may be valid for the entire rental period and may then expire automatically. The virtual key 51 may expire and/or may be automatically deleted from the portable electronic device 30.

In order to increase the security of the system, an internal clock 11, 31 of the vehicle 10 and/or the portable electronic device 30 may be updated upon the occurrence of a triggering event.

Figure 3:
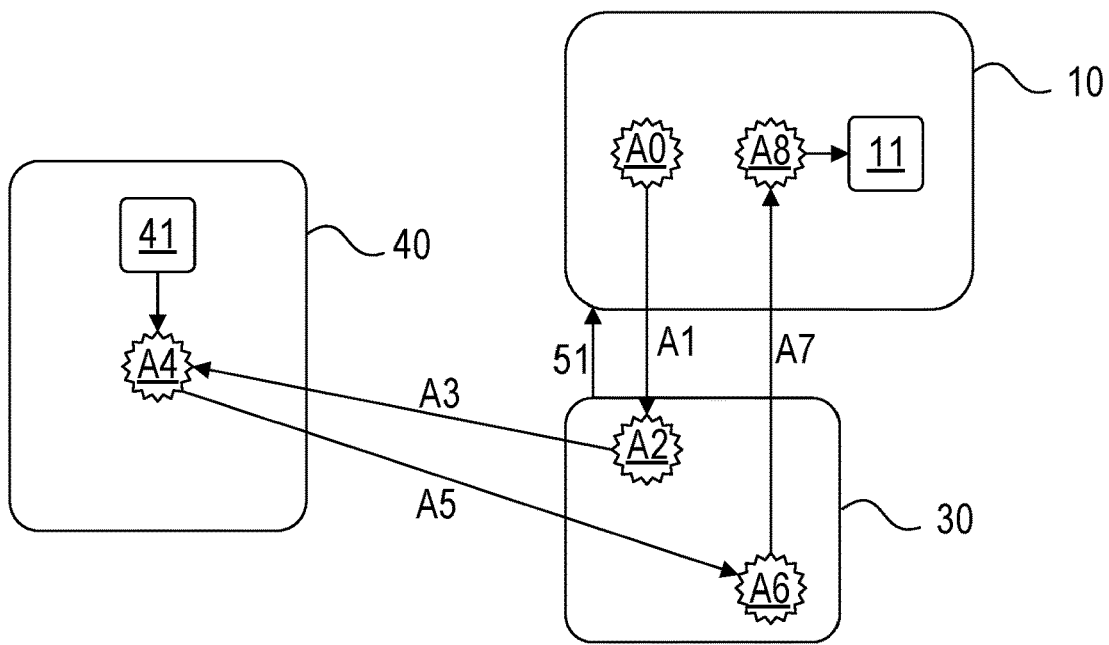
FIG. 3 illustrates an exemplary system and method according to one embodiment of the present invention.

Referring to FIG. 3, the triggering event may be brought about by a user intending to use the virtual key 51. For example, the virtual key 51 may be sent from the portable electronic device 30 to the vehicle 10 (e.g., upon request of the user or when it has been detected that the portable electronic device 30 is within a certain range of the vehicle). The vehicle 10 checks whether the virtual key 51 is an authorized/valid key. This check may include comparing a present time of an internal clock 11 of the vehicle 10 with a timestamp included in the virtual key 51. The timestamp may include an indication as to the time interval during which the virtual key 51 is valid. For example, a virtual key 51 may only be valid on a certain day from 15 h to 16 h. The vehicle 10, therefore, checks the present date and time and compares it to the timestamp provided with the virtual key 51. Before performing such a check, however, the vehicle 10 may update its internal clock 11 (step A0). Updating the internal clock 11 of the vehicle 10 may include sending a first request message to the portable electronic device 30 (step A1). The portable electronic device 30 receives the first request message (step A2) and sends a second request message to the backend device 40 (step A3). The backend device 40 may be a server, for example. The backend device 40 may be owned and managed, e.g., by a car manufacturer, an Original Equipment Manufacturer (OEM), a car rental company, or any third party supplier, for example.

The backend device 40 receives the second request message (step A4), reads the present time from its own internal clock 41, and sends a first response message to the portable electronic device 30 (step A5). The portable electronic device receives the first response message (step A6) and forwards it in a second response message to the vehicle 10 (step A7). The vehicle 10 receives the second response message (step A8) and updates its internal clock 11 based on the information included in the second response message. The portable electronic device 30, therefore, acts as an intermediary between the vehicle 10 and the backend device 40. Many vehicles today do not provide internet access and are not connected to a telephone network. Using the portable electronic device 30 as an intermediary, therefore, provides an easy and fast solution for updating the internal clock 11 of the vehicle 10.

The backend device 40 may also update its own internal clock 41 either on a regular basis or upon request, for example. As is exemplarily illustrated in FIG. 4, the backend device 40 may generate and send a third request message to a network time protocol (NTP) server (steps B0, B1). The NTP server receives the third request message (step B2) and sends a response message, including information concerning the present time, back to the backend device 40 (step B3). In particular, the response message may include the present universal time. The backend device 40 may then update its internal clock 41 based on this information (step B4). According to one example, the backend device 40 may update its internal clock 41 (steps B0-B4) upon receipt of a request message from the portable electronic device 30. For example, the backend device 40 may update its internal clock 41 upon receipt of a second request message from the portable electronic device 30 and before sending a first response message to the portable electronic device 30. According to another example, the backend server 40 may update its internal clock 40 regularly, e.g., every few second, or every few minutes.

The portable electronic device 30 may forward the information concerning the present time to the vehicle 10, as has been described with respect to FIG. 3 above. According to another example, as is illustrated in FIG. 5, the portable electronic device 30 may additionally or alternatively update its own internal clock 31. While in the examples according to FIGS. 3 and 4 the portable electronic device 30 acted as an intermediary without necessarily updating its own internal clock 31, the internal clock 31 is updated in the example of FIG. 5. For example, upon occurrence of a triggering event (step C2), the portable electronic device 30 may send a request message to the backend device 40 (step C3). The triggering event may be an application that is installed on the portable electronic device 30 requesting the update/synchronization of the portable electronic device's clock 31 (steps C0, C1), for example. The backend device 40 receives the request message (step C4), and sends a response message to the portable electronic device 30 including information about the present time of the backend device's internal clock 41 (step C5). The portable electronic device 30 receives the response message (step C6) and subsequently updates the internal clock 31.

Figure 4:
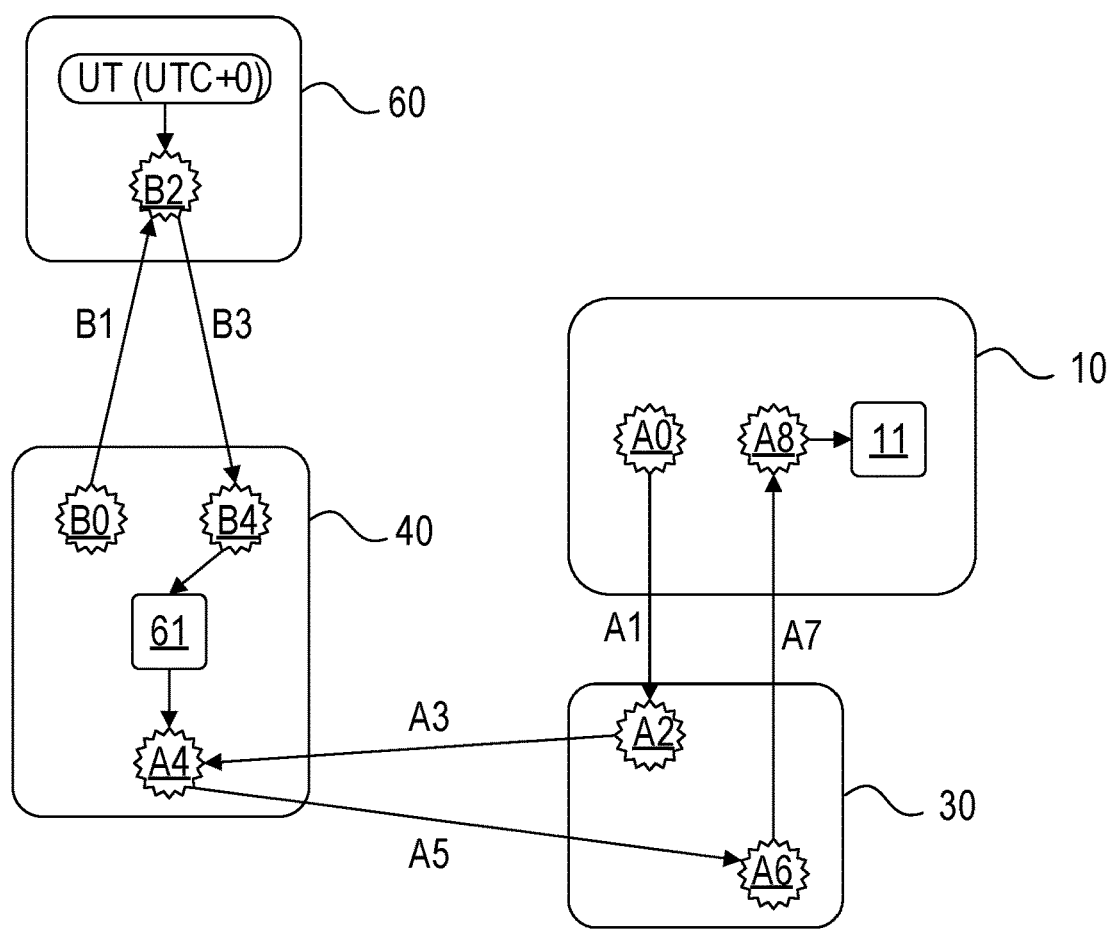
FIG. 4 illustrates an exemplary system and method according to another embodiment of the present invention.
Figure 5:
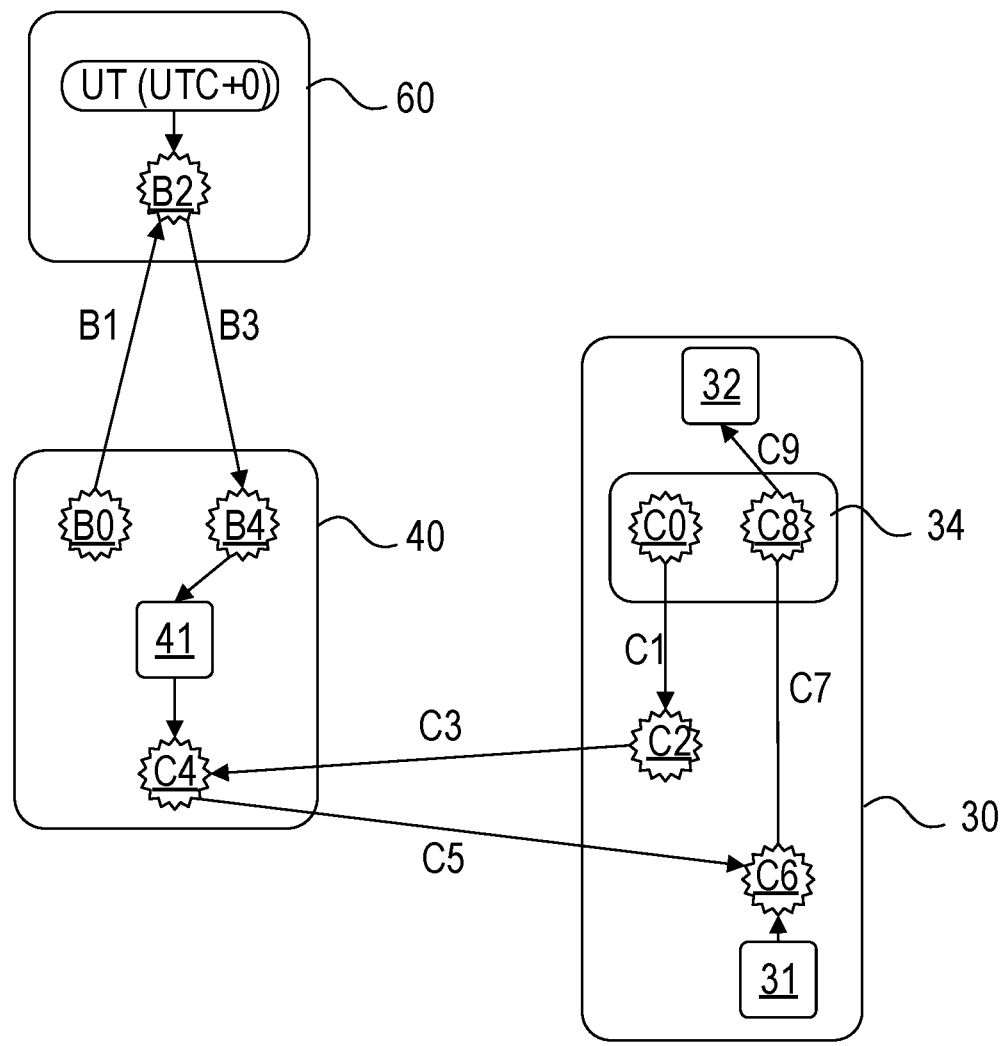
FIG. 5 illustrates an exemplary system and method according to another embodiment of the present invention.

In the example of FIG. 5, the internal clock 41 of the backend device 40 may be updated in the same way as has been described with respect to FIG. 4 above. For example, the backend device 40 may update its internal clock 41 upon receipt of a request message from the portable electronic device 30 (step C4) and before sending out the response message to the portable electronic device 30 (step C5).

According to one example, after receiving the response message from the backend device 40, the portable electronic device 30 may determine a time jitter (step C7). That is, the portable electronic device 30 may determine a deviation from the internal clock 31 and the actual time received via the response message before updating the internal clock 31. The determined time jitter may be further analyzed. According to one example, when the time jitter is detected to exceed a predefined threshold value, the user may be requested, via a user interface 32, to activate the time synchronization either by network configuration or by manual configuration.

For example, when receiving the response message from the backend device 40, it may be determined that the time settings of the portable electronic device 30 are incorrect. For example, the user may have moved into another time zone without having updated the time zone settings of the portable electronic device 40. The time jitter may be determined to be, e.g., −1 h, +1 h, −2 h, +2 h, −3 h, +3 h, etc. Therefore, the user may be requested to change the time settings of the portable electronic device 30 either manually or to allow an automatic update of the time zone. Most portable electronic devices 30 today allow for an automatic update of the time zone. For example, the time zone transmitted with the present time from the NTP server may be automatically adopted by the portable electronic device 30. If the time zone of the portable electronic device 30 is not correct and does not match the present time at the present location of the portable electronic device 30, the virtual key 51 may be determined to be invalid.

Figure 6:
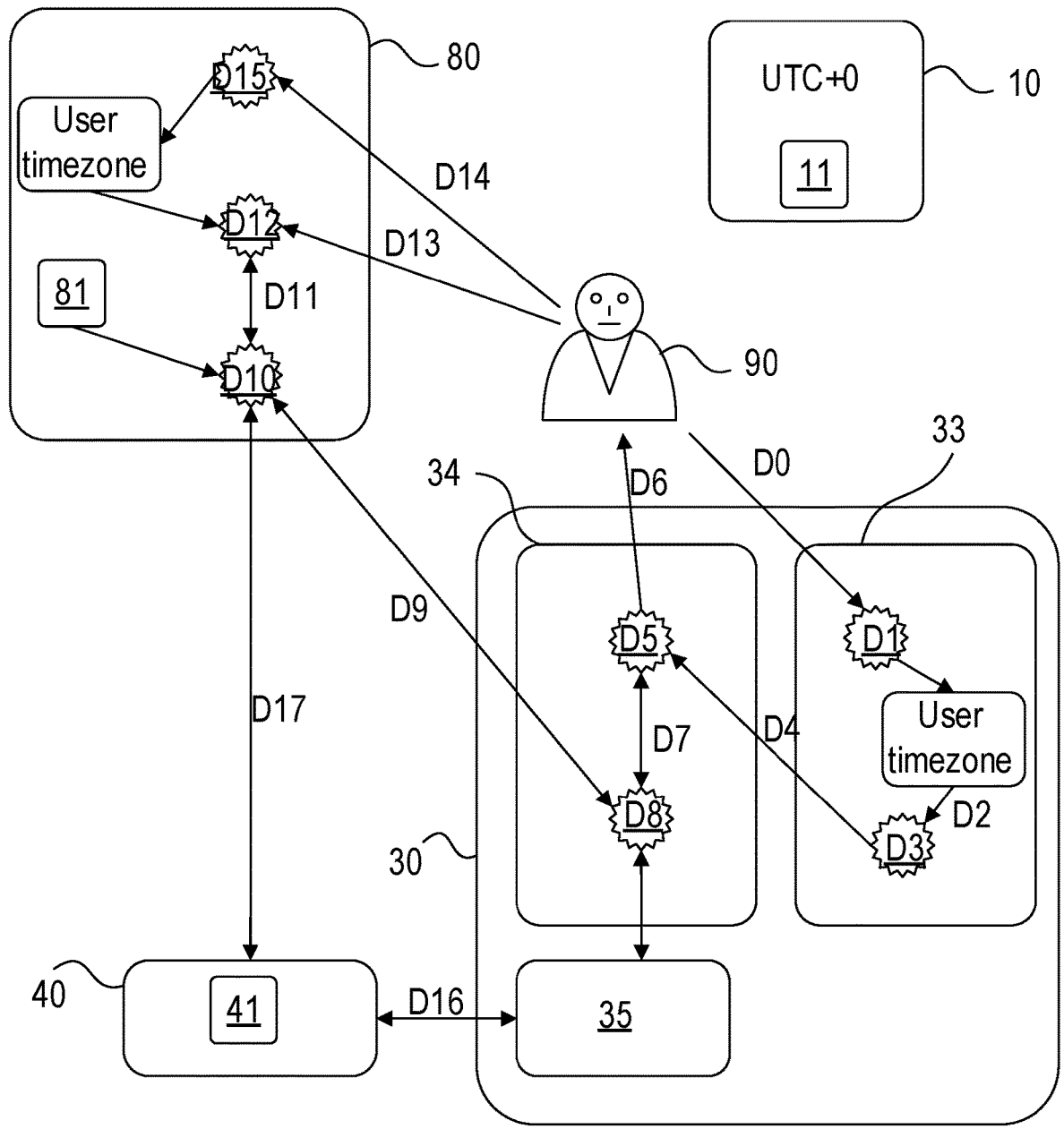
FIG. 6 illustrates an exemplary system and method according to another embodiment of the present invention.

Now referring to FIG. 6, the interaction of the different devices of the system is exemplarily illustrated for better understanding. The vehicle 10 with its internal clock 11 is illustrated in FIG. 6. However, not necessarily being part of the system, no interactions between the vehicle 10 and other devices of the system are presented in FIG. 6. Exemplary interactions between the vehicle 10 and the portable electronic device 30 are described with respect to FIGS. 3 and 4 above.

The portable electronic device 30 may comprise an operating system 33, a first application 34 (or software development kit SDK which allows the creation of applications for a certain operating system) and a second application 35 (or SDK). The operating system 33 may be a Microsoft Windows based, Android based or iOS based operating system, for example. Any other operating systems, however, are also possible. The first application 34 may be provided by a fleet management, or an OEM (Original Equipment Manufacturer), for example. The second application 35 may be provided by a manufacturer of the system for granting access to or for starting an object, for example.

The operating system 33 may include time settings. That is, the present time zone and local time may be set by the operating system 33. For example, a user 90 may configure the time settings of the portable electronic device 30 (step D0). Upon a request from the user 90, the time zone may be updated, as has been described with respect to FIG. 5 above (step D1). The first application 34 may access the time settings of the operating system 33, or the operating system 33 may read the time settings (step D2), and provide the time settings to the first application 34 (steps D3 and D4). The first application 34 may visualize the time zone settings that were submitted from the operating system 34 on a user interface, for example (step D6, user interface not specifically illustrated in FIG. 6). The user 90 may optionally request the first application 34 to use a standard time, e.g., UTC+0. The second application 35 may also update its time zone settings based on the time settings of the operating system 33 and the first application 34.

The second application 35 may communicate with the backend device 40 (step D16). This communication may take place according to the example that has been described with respect to FIGS. 3 and 4 above. The portable electronic device 30 and the backend device 40 may further communicate with a server device 80. The server device 80 may be owned and managed, e.g., by a car manufacturer, an Original Equipment Manufacturer (OEM), a car rental company, or any third party supplier, for example. The user 90 may configure the present time zone also within the server device 80, for example (steps D14, D15). The user 90 may further request the server device 80 to convert the present time zone to UTC+0 time (steps D12, D13). The conversion, however, may also be performed automatically after configuration of the time zone by the user 90. An internal clock 81 of the server device 80 may be updated in accordance with the time zone settings. After conversion to UTC+0, the user may request to use the converted time for any further operations (steps D11, D10). The server device 80 may communicate with the backend device 40 and the portable electronic device 30 in this regard, that UTC+0 is to be used (steps D9, D17).

The invention has been described using the example of a vehicle. However, it is also possible to use the invention for many other applications and objects, e.g., for unlocking doors or gates of buildings. For example, a caretaker may be permitted to unlock the door to a building and control different functions of the building during his shift only. The caretaker may receive a new virtual key 51 on his portable electronic device 30 for each of his shifts. The virtual keys 51 on his portable electronic device 30, however, may expire once his shift ends and he may no longer be able to enter the building until he receives the next virtual key 51. When the caretaker wants to enter the building, the clock may be updated in the same way as has been described with reference to the Figures above.

LIST OF REFERENCE SIGNS 10 vehicle
11 internal clock
20 control unit
30 transponder unit
31 internal clock
32 user interface
33 operating system
34 first application
35 second application
40 backend device
41 internal clock
51 virtual key
60 NTP server
80 server device
81 internal clock
90 user

The invention claimed is:

1. A method comprising
sending a virtual key from a portable electronic device to an object, wherein the virtual key is valid for a predefined period of time and includes information about the predefined period of time,
comparing, in the object, the information about the predefined period of time with an internal clock, wherein the object may be opened or started when the virtual key is determined to be valid at the time of receipt of the virtual key,
before comparing the information about the predefined period of time with an internal clock, sending a second request message from the object to the portable electronic device,
upon receipt of the second request message in the portable electronic device, sending a first request message from the portable electronic device to a backend device,
upon receipt of the first request message, reading an internal device clock and sending a first response message from the backend device to the portable electronic device, wherein the first response message comprises information about the present internal device time, and
upon receipt of the first response message, at least one of:
updating an internal clock of the portable electronic device with the present internal device time; and
sending a second response message to an object, wherein the second response message comprises information about the present internal device time.

2. A system comprising:
a portable electronic device,
an object, and
a backend device,
wherein the portable electronic device is configured to send a virtual key to the object, wherein the virtual key is valid for a predefined period of time and includes information about the predefined period of time;
wherein the object is configured to receive the virtual key from the portable electronic device, and compare the information about the predefined period of time with an internal clock, wherein the object may be opened or started when the virtual key is determined to be valid at a time of receipt of the virtual key;
wherein the object is configured to, before comparing the information about the predefined period of time with an internal clock, send a second request message to the portable electronic device;
wherein the portable electronic device is configured to send a first request message to the backend device upon receipt of the second request message from the object;
wherein the backend device is configured to read an internal device clock and send a first response message to the portable electronic device upon receipt of the first request message, wherein the first response message comprises information about present internal device time; and
wherein the portable electronic device is further configured, upon receipt of the first response message, to at least one of:
update an internal clock of the portable electronic device with the present internal device time, and
send a second response message to an object, wherein the second response message comprises information about the present internal device time.

3. The system of claim 2, wherein a triggering event comprises a user input received via a user interface of the portable electronic device.

4. The system of claim 2, wherein the backend device is further configured to, upon receipt of the first request message, perform an update of its internal device clock.

5. The system of claim 2, wherein updating the internal device clock of the backend device comprises sending a third request message to a network time protocol server and receiving a second response message from the network time protocol server, the second response message comprising information about present time.

6. The system of claim 2, wherein the first response message comprises information about a time zone, the portable electronic device is configured to compare the time zone information of the first response message with a time zone setting of the portable electronic device, and automatically update or require a user to manually update the time zone settings of the portable electronic device, if a difference between the time zone information of the first response message and the time zone settings of the portable electronic device is greater than a predefined threshold value.

7. The system of claim 2, wherein the object is a vehicle.

* * * * *